United States Patent [19]
Agano

[11] Patent Number: 5,337,076
[45] Date of Patent: Aug. 9, 1994

[54] METHOD AND APPARATUS FOR REPRODUCING IMAGES INCLUDING A MULTIPLE SCANNING OPERATION

[75] Inventor: Toshitaka Agano, Kanagawa, Japan

[73] Assignee: Fuji Photo Film Co., Ltd., Kanagawa, Japan

[21] Appl. No.: 870,307

[22] Filed: Apr. 17, 1992

[30] Foreign Application Priority Data

Apr. 19, 1991 [JP] Japan .................................. 3-088571

[51] Int. Cl.⁵ .......................... H04N 1/21; B41J 2/435
[52] U.S. Cl. ...................................... 346/108; 358/298
[58] Field of Search ................ 346/76 L, 108, 107 R, 346/1.1, 160; 358/298

[56] References Cited

U.S. PATENT DOCUMENTS

| | | | |
|---|---|---|---|
| 4,257,053 | 3/1981 | Gilbreath | 346/108 |
| 4,363,037 | 12/1982 | Taudt | 358/296 |
| 4,757,191 | 7/1988 | Shimada et al. | 250/205 |
| 4,762,998 | 8/1988 | Lubinsky et al. | 250/327.2 |
| 4,775,892 | 10/1988 | Surdyke | 358/227 |

FOREIGN PATENT DOCUMENTS 349471  3/1991  Japan .

Primary Examiner—Mark J. Reinhart
Attorney, Agent, or Firm—Sughrue, Mion, Zinn, Macpeak & Seas

[57] ABSTRACT

A light beam is modulated in accordance with an image signal, which is made up of a series of image signal components representing an image recorded on a recording medium, and the modulated light beam is caused by a light beam scanning system, which includes a rotating polygon mirror, to two-dimensionally scan a recording material, the image being thereby reproduced on the recording material. The light beam modulated in accordance with image signal components of the image signal, which correspond to positions lying along each scanning line on the recording medium, is utilized to scan along a plurality of scanning lines on the recording material such that parts of adjacent scanning lines on the recording material may overlap one upon the other. The intensity of the light beam is changed each time the light beam scans along one of the plurality of the scanning lines on the recording material. Each scanning line composed of the plurality of the scanning lines on the recording material is thereby prevented from having an appearance which is not sharp and the sharpness of the image reproduced on the recording material is kept high.

16 Claims, 5 Drawing Sheets

FIG. 4
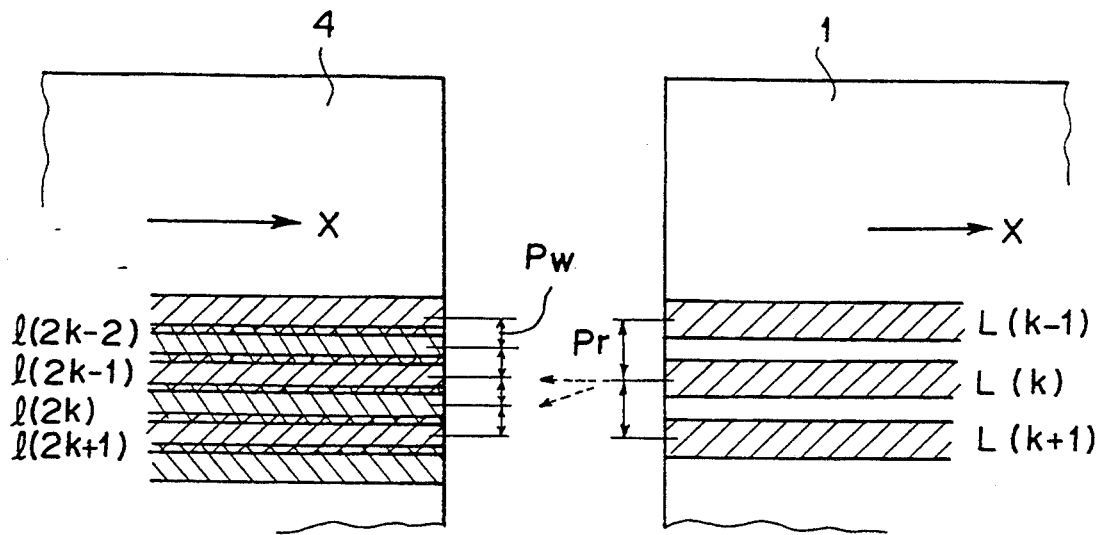
FIG. 5A 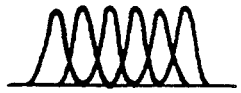   FIG. 5B 
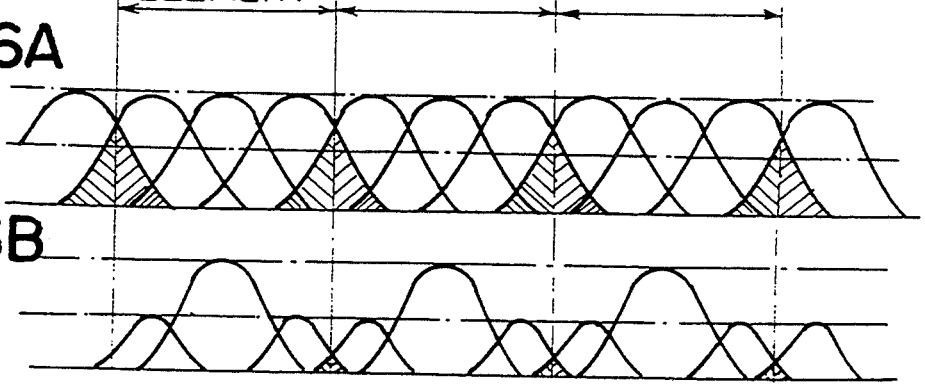
FIG. 6A
FIG. 6B

METHOD AND APPARATUS FOR REPRODUCING IMAGES INCLUDING A MULTIPLE SCANNING OPERATION

BACKGROUND OF THE INVENTION

1. Field of the Invention

This invention relates to a method for reproducing an image on a recording material, such as a photosensitive material, and an apparatus for carrying out the method. This invention particularly relates to an image reproducing method, wherein a recording light beam is caused to scan a recording material by a light beam scanning system, which includes a rotating polygon mirror, and an apparatus for carrying out the method.

2. Description of the Prior Art

Image reproducing methods, wherein light beam scanning systems are utilized to scan recording light beams, have heretofore been known. In such an image reproducing method, a light beam is caused by a light beam scanning system to two-dimensionally scan a recording medium, on which an image has been recorded. Light, which carries information about the image, is thereby radiated out of part of the recording medium, which is being exposed to the light beam. The light, which has been radiated out of the recording medium, (i.e., light reflected by the recording medium, light which has passed through the recording medium, or light emitted by the recording medium) is detected by a photoelectric read-out means, and an image signal is thereby obtained which is made up of a series of image signal components representing the image recorded on the recording medium. Also, a light beam is modulated in accordance with the image signal, which has thus been obtained, and is caused by the light beam scanning system to two-dimensionally scan a recording material. In this manner, the image is reproduced on the recording material. Such a method is disclosed in, for example, U.S. Pat. No 4,975,580.

As described above, in the aforesaid image reproducing methods, light beam scanning systems are utilized to scan recording light beams. A light beam scanning system is ordinarily constituted of a mechanical light deflector, which causes the light beam to scan in a main scanning direction, and a sub-scanning means for conveying a recording media, on which an image has been recorded, or a recording material, on which an image is to be reproduced, in a sub-scanning direction, which is approximately normal to the main scanning direction. In many cases, rotating polygon mirrors which have a plurality of reflecting surfaces are used as the mechanical light deflectors. A rotating polygon mirror is advantageous over a galvanometer mirror in that the speed at which the light beam is deflected can be increased, which allows an image reproducing operation to be carried out quickly.

However, the rotating polygon mirror has problems in that the reflectivity fluctuates among the reflecting surfaces and, therefore, nonuniformity in the intensity of the scanning light beam occurs. The rotating polygon mirror also has problems in that the inclination with respect to the rotation axis of the rotating polygon mirror and the distance therefrom differ among the reflecting surfaces. Additionally, the speed at which the rotating polygon mirror is rotated fluctuates periodically, so that the speed at which the light beam is deflected differs among the reflecting surfaces of the rotating polygon mirror. If the intensity of the light beam and the speed, at which the light beam scans a recording material, fluctuate, nonuniformity in the image density will occur in the image reproduced on the recording material, and the image quality of the reproduced image cannot be kept good.

Accordingly, a method has been proposed to prevent the nonuniformity in the image density from occurring in the reproduced image. In the proposed method, when an image is to be reproduced on a recording material, a light beam modulated in accordance with image signal components of an image signal, which have been obtained from each scanning line during the operation for reading out an image recorded on a recording medium, is utilized to scan along a plurality of scanning lines on the recording material. (Such a scanning operation will hereinbelow be referred to as the multiple type of scanning operation.) In this manner, the scanning density with respect to the sub-scanning direction, which is normal to the scanning lines, is set at a higher density and the nonuniformity in the image density in the image reproduced on the recording material is rendered less perceptible than when the light beam modulated in accordance with the image signal components, which have been obtained from each scanning line on the recording medium, is utilized to scan along a single scanning line on the recording material.

FIG. 3 is a graph showing perceptibility characteristics of a difference in image density. Specifically, levels of the difference $\Delta D$ in the image density capable of being perceived by a person from a pattern, in which the image density changes in a sinusoidal form within the range of the difference $\Delta D$ in the image density, were determined with respect to the spatial frequency. FIG. 3 shows an example of the results of the determination. In FIG. 3, the region above curve "a" is the one in which the difference $\Delta D$ in the image density can be perceived. The region below curve "b" is the one in which the difference $\Delta D$ in the image density cannot be perceived. The region between curve "a" and curve "b" is the one in which the difference $\Delta D$ in the image density can be or cannot be perceived, depending on the person who observes the image density pattern and the apparatus used for the determination. As illustrated in FIG. 3, in the region of the spatial frequency higher than approximately 0.5 line/mm (in the cases of ordinary image reproducing operations, the pitch of the scanning line falls within this region), the minimum value of the difference $\Delta D$ in the image density, which can be perceived, becomes larger as the spatial frequency is higher. Specifically, as the spatial frequency is higher, only a higher level of the difference $\Delta D$ in the image density can be perceived. Therefore, when the pitch of the scanning line is set at a small value (i.e., when the scanning density is increased) by carrying out the multiple type of scanning operation, the nonuniformity in the image density of a reproduced image becomes less perceptible.

Methods for rendering the nonuniformity in the image density of a reproduced image imperceptible by carrying out the multiple type of scanning operation have been proposed in, for example, U.S. Pat. Nos. 4,363,037 and 4,775,896 and Japanese Unexamined Patent Publication No. 3(1991)-49471.

However, when the nonuniformity in the image density of a reproduced image is rendered imperceptible by carrying out the multiple type of scanning operation, a single scanning line on the recording medium, on which the image has been recorded, is replaced by a plurality of scanning lines on the recording material, on which the image is to be reproduced. Therefore, problems occur in that each scanning line composed of the plurality of the scanning lines does not have a sharp appearance on the recording material. Specifically, as the number of the plurality of the scanning lines on the recording material, which replace a single scanning line on the recording medium, becomes larger, the nonuniformity in the image density of the reproduced image becomes less perceptible, but the sharpness of the reproduced image becomes lower.

SUMMARY OF THE INVENTION

The primary object of the present invention is to provide an image reproducing method, wherein nonuniformity in the image density of an image reproduced on a recording material is rendered imperceptible by carrying out the multiple type of scanning operation, and each scanning line on the recording material is prevented from having an appearance which is not sharp.

Another object of the present invention is to provide an image reproducing method, wherein nonuniformity in the image density of a reproduced image is rendered imperceptible, and at the same time the sharpness of the reproduced image is kept high.

The specific object of the present invention is to provide an apparatus for carrying out the image reproducing method.

The present invention provides an image reproducing method, wherein a light beam is modulated in accordance with an image signal, which is made up of a series of image signal components representing an image recorded on a recording medium, and the modulated light beam is caused by a light beam scanning system, which includes a rotating polygon mirror, to two-dimensionally scan a recording material, whereby the image is reproduced on the recording material, the image reproducing method comprising the steps of:
i) utilizing the light beam modulated in accordance with image signal components of said image signal, which correspond to positions lying along each scanning line on said recording medium, to scan along a plurality of scanning lines on said recording material such that parts of adjacent scanning lines on said recording material may overlap one upon the other, and
ii) changing the intensity of said light beam each time said light beam scans along one of the plurality of said scanning lines on said recording material.

In the image reproducing method in accordance with the present invention, by way of example, the intensity of said light beam is set at a higher level during the scanning along a middle scanning line among the plurality of said scanning lines on said recording material, and is set at a lower level during the scanning along an outer scanning line among the plurality of said scanning lines on said recording material.

The present invention also provides an image reproducing apparatus, wherein a light beam is modulated in accordance with an image signal, which is made up of a series of image signal components representing an image recorded on a recording medium, and the modulated light beam is caused by a light beam scanning system, which includes a rotating polygon mirror, to two-dimensionally scan a recording material, whereby the image is reproduced on the recording material, the image reproducing apparatus comprising:
i) a scanning means for carrying out the scanning such that the light beam modulated in accordance with image signal components of said image signal, which correspond to positions lying along each scanning line on said recording medium, may be utilized to scan along a plurality of scanning lines on said recording material, and parts of adjacent scanning lines on said recording material may overlap one upon the other, and
ii) a light beam intensity control means for changing the intensity of said light beam each time said light beam scans along one of the plurality of said scanning lines on said recording material.

In the image reproducing apparatus in accordance with the present invention, by way of example, the light beam intensity control means changes the intensity of said light beam such that it may be set at a higher level during the scanning along a middle scanning line among the plurality of said scanning lines on said recording material, and may be set at a lower level during the scanning along an outer scanning line among the plurality of said scanning lines on said recording material.

With the image reproducing method and apparatus in accordance with the present invention, the light beam modulated in accordance with image signal components of the image signal, which correspond to positions lying along each scanning line on the recording medium, is utilized to scan along a plurality of scanning lines on the recording material, e.g., a photosensitive material, such that parts of adjacent scanning lines on the recording material may overlap one upon the other. Also, the intensity of the light beam is changed each time the light beam scans along one of the plurality of the scanning lines on the recording material. Therefore, each scanning line composed of the plurality of the scanning lines on the recording material can be prevented from having an appearance which is not sharp. Also, the sharpness of the image reproduced on the recording material can be kept high.

BRIEF DESCRIPTION OF THE DRAWINGS

FIG. 4 is an explanatory view showing how a light beam scans a recording material when an image is to be reproduced on the recording material, FIGS. 5A and 5B are graphs showing examples of how the intensity of a light beam is distributed when the light beam modulated in accordance with image signal components of an image signal, which have been obtained from each scanning line during the operation for reading out an image recorded on a recording medium, is utilized to scan along a plurality of scanning lines on a recording material, FIGS. 6A and 6B are graphs showing examples of how the intensity of a light beam is distributed when the light beam modulated in accordance with image signal components of an image signal, which have been obtained from each scanning line during the operation for reading out an image recorded on a recording medium, is utilized to scan along three scanning lines on a recording material.

DESCRIPTION OF THE PREFERRED EMBODIMENTS

The present invention will hereinbelow be described in further detail with reference to the accompanying drawings.

First, how an image reproducing method is carried out will be described below. In the image reproducing method, a light beam modulated in accordance with image signal components of an image signal, which have been obtained from each scanning line during the operation for reading out an image recorded on a recording medium, such as a stimulable phosphor sheet, is utilized to scan along a plurality of scanning lines on a recording material, such as a photosensitive material. The scanning along the plurality of the scanning lines on the recording material is carried out at reduced pitches of the scanning lines, and nonuniformity in the image density of the image reproduced on the recording material is thereby rendered imperceptible.

Figure 1:
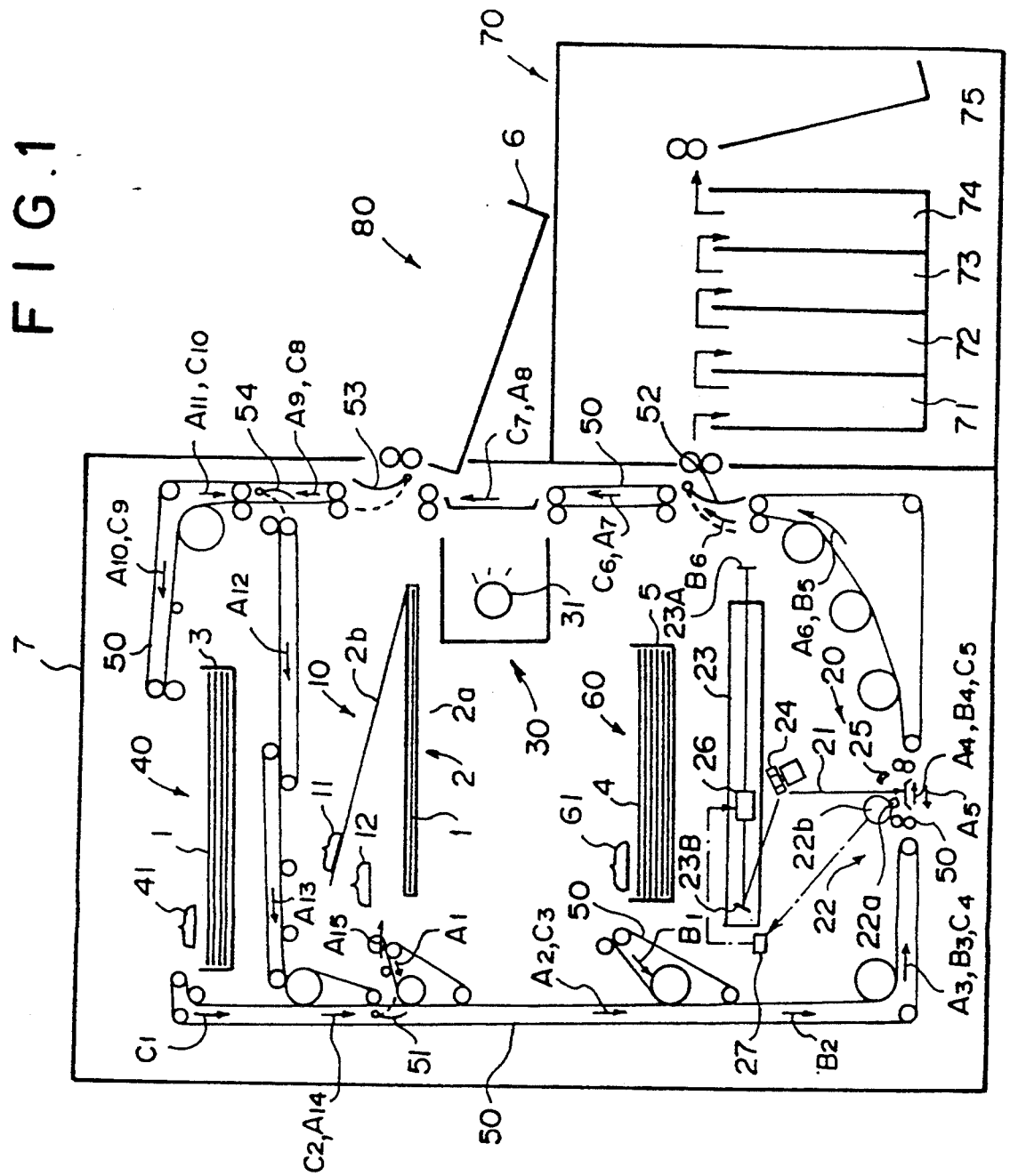
FIG. 1 is a schematic view showing an example of an image read-out and reproducing apparatus, wherein an embodiment of the image reproducing method in accordance with the present invention may be employed.

FIG. 1 shows an example of an image read-out and reproducing apparatus, wherein a radiation image is read out from a stimulable phosphor sheet, on which the radiation image has been stored, an image signal representing the radiation image is thereby obtained, and a visible radiation image is then reproduced from the image signal.

As illustrated in FIG. 1, the image read-out and reproducing apparatus is provided with a cassette holding section 10 for releasably holding a cassette 2, which is capable of housing a stimulable phosphor sheet 1 therein, and a magazine holding section 40 for releasably holding a stimulable phosphor sheet magazine 3, which is capable of housing a plurality of stimulable phosphor sheets 1, 1, . . . therein. The image read-out and reproducing apparatus is also provided with a recording sheet feeding section 60 for releasably holding a recording sheet feeding magazine 5, which is capable of housing a plurality of photosensitive recording sheets 4, 4, . . . therein, and a light beam scanning section 20 for reading out a radiation image stored on the stimulable phosphor sheet 1 and reproducing the radiation image, which has thus been read out, on the recording sheet 4. The image read-out and reproducing apparatus is additionally provided with an erasing section 30 for erasing radiation energy remaining on the stimulable phosphor sheet 1 after the image readout therefrom is finished in the light beam scanning section 20, and an automatic developing section 70 for carrying out a developing process on the recording sheet 4, on which the radiation image has been reproduced in the light beam scanning section 20. The image read-out and reproducing apparatus is further provided with a tray holding section 80 for releasably holding a tray 6, which is capable of housing a plurality of the stimulable phosphor sheets 1, 1, . . . therein. Furthermore, the image read-out and reproducing apparatus is provided with a first stimulable phosphor sheet conveyance means for receiving the stimulable phosphor sheet 1, which has been fed out of the cassette holding section 10, conveying the stimulable phosphor sheet 1 into the light beam scanning section 20 and the erasing section 30 in this order, and then conveying the stimulable phosphor sheet 1 into the cassette holding section 10. Moreover, the image read-out and reproducing apparatus is provided with a second stimulable phosphor sheet conveyance means for receiving the stimulable phosphor sheet 1, which has been fed out of the magazine holding section 40, and conveying the stimulable phosphor sheet 1 into the light beam scanning section 20, the erasing section 30 and the tray holding section 80 in this order. The image read-out and reproducing apparatus is additionally provided with a recording sheet conveyance means for receiving the recording sheet 4, which has been fed out of the recording sheet feeding section 60, and conveying the recording sheet 4 into the light beam scanning section 20 and the automatic developing section 70 in this order. Most parts of these three conveyance means are formed commonly to one another. Therefore, these three conveyance means will hereinbelow be referred to as a sheet conveyance means 50.

In an external image recording apparatus (not shown), the radiation image has been stored on the stimulable phosphor sheet 1 housed in the cassette 2. The cassette 2 housing the stimulable phosphor sheet 1, on which the radiation image has been stored, is fed into the cassette holding section 10. The cassette 2 is light-tight so that the stimulable phosphor sheet 1 is prevented from exposure to external light when it is exposed to radiation in order to have a radiation image recorded thereon. The cassette 2 comprises a cassette body 2a, in which the stimulable phosphor sheet 1 is to be housed, and an openable cover member 2b. When the cassette 2 is fed into the cassette holding section 10, the cover member 2b is maintained in the closed position. As illustrated in FIG. 1, when the stimulable phosphor sheet 1 is to be taken out of the cassette 2 in the cassette holding section 10, the cover member 2b is opened by a cover opening means 11, which may be constituted of an air suction cup, or the like. When the cover member 2b has been opened, a stimulable phosphor sheet take-out means 12, which may be constituted of an air suction cup, or the like, advances into the cassette 2 and sucks the stimulable phosphor sheet 1. Then, the stimulable phosphor sheet take-out means 12 feeds the stimulable phosphor sheet 1 into the sheet conveyance means 50, which is located in the vicinity of the cassette 2. The stimulable phosphor sheet 1 has been housed in the cassette 2 with its front surface facing down. It is the front surface which is provided with a stimulable phosphor layer.

The stimulable phosphor sheet 1, which has been taken out of the cassette 2 in the manner described above, is conveyed by the sheet conveyance means 50 in the direction indicated by the arrow A1. A distribution means 51 is located in the sheet conveyance means 50. The distribution means 51 is movable between the position indicated by the solid line and the position indicated by the broken line in FIG. 1. At the time at which the stimulable phosphor sheet 1 is fed out of the cassette 2, the distribution means 51 is maintained at the position indicated by the solid line and allows the conveyance of the stimulable phosphor sheet 1 toward the light beam scanning section 20. The stimulable phosphor sheet 1 is further conveyed into the light beam scanning section 20 in the directions indicated by the arrows A2 and A3.

In the light beam scanning section 20, the stimulable phosphor sheet 1, on which the radiation image has been stored, is scanned with a laser beam 21. The laser beam 21 serves as stimulating rays, which cause the stimulable phosphor sheet 1 to emit light in proportion to the amount of energy stored thereon during its exposure to radiation. The light emitted by the stimulable phosphor sheet 1 is photoelectrically detected by a photoelectric read-out means 22, which may be composed of a long photomultiplier 22b, or the like. In this manner, an electric image signal is obtained which is to be used during the reproduction of a visible image. Reference numeral 23 represents a laser beam source, such as a He-Ne laser. Reference numerals 23A and 23B represent mirrors. Reference numeral 24 represents a rotating polygon mirror, which serves as a light deflector. Reference numeral 25 represents a reflection mirror for reflecting the light, which is emitted by the stimulable phosphor sheet 1, towards a light guide member 22a of the photoelectric read-out means 22. The light guide member 22a guides the emitted light through repeated total reflection therein up to a light receiving face of the long photomultiplier 22b. The light receiving face of the long photomultiplier 22b is elongated and extends along a main scanning line of the laser beam 21 on the stimulable phosphor sheet 1. Such a long photomultiplier 22b is described in detail in, for example, U.S. Pat. No. 4,864,134. Reference numeral 26 denotes a light modulator, such as an acousto-optic modulator (AOM), which is not activated when the laser beam 21 scans the stimulable phosphor sheet 1.

The stimulable phosphor sheet 1, which has been fed into the light beam scanning section 20, is conveyed by the sheet conveyance means 50 in the direction indicated by the arrow A4 (i.e. in the sub-scanning direction). At the same time, the stimulable phosphor sheet 1 is scanned (in the main scanning direction) with the laser beam 21, which has been deflected in a direction which is approximately normal to the direction of conveyance of the stimulable phosphor sheet 1. As a result, the overall surface of the stimulable phosphor sheet 1 is scanned two-dimensionally with the laser beam 21. When the stimulable phosphor sheet 1 is exposed to the laser beam 21, the exposed portion of the stimulable phosphor sheet 1 emits light in proportion to the amount of energy stored thereon during its exposure to radiation. The light emitted by the stimulable phosphor sheet 1 in the course of the scanning is guided through the light guide member 22a and detected by the long photomultiplier 22b. The long photomultiplier 22b converts the detected amount of the emitted light into an electric signal. The electric signal thus obtained (the read-out image signal) is then fed into an image processing unit 27, which carries out an amplifying process and a correcting process on the electric signal.

After the image readout from the stimulable phosphor sheet 1 is finished in the light beam scanning section 20, the stimulable phosphor sheet 1 is conveyed by the sheet conveyance means 50 into the erasing section 30 in the directions indicated by the arrows A6 and A7. A distribution means 52 is disposed between the light beam scanning section 20 and the erasing section 30. At the time at which the stimulable phosphor sheet 1 is thus conveyed, the distribution means 52 is maintained at the position indicated by the solid line in FIG. 1 and guides the stimulable phosphor sheet 1 into the erasing section 30.

In the erasing section 30, radiation energy, which remains on the stimulable phosphor sheet 1 after the image readout therefrom is finished, is erased. Specifically, part of the radiation energy, which was stored on the stimulable phosphor sheet 1 at the image recording step, remains stored thereon after the radiation image has been read out therefrom. In order to make the stimulable phosphor sheet 1 reusable, the residual radiation energy is erased in the erasing section 30. In this example, the erasing section 30 is provided with a plurality of erasing light sources 31, 31, . . ., which may be constituted of fluorescent lamps, tungsten-filament lamps, sodium lamps, xenon lamps, iodine lamps, or the like. The stimulable phosphor sheet 1 is exposed to the erasing light produced by the erasing light sources 31, 31, . . ., and the residual radiation energy is thereby released from the stimulable phosphor sheet 1 while the stimulable phosphor sheet 1 is being conveyed in the direction indicated by the arrow A8. In the erasing section 30, any of other known erasing methods may be used. For example, erasing may be conducted by heating or by a combination of exposure to the erasing light and heating.

After the stimulable phosphor sheet 1 has been erased by the erasing section 30, the stimulable phosphor sheet 1 is guided by distribution means 53 and 54, which are maintained in advance at the positions indicated by the solid lines. The stimulable phosphor sheet 1 is thus conveyed in the directions indicated by the arrows A9 and A10. Then, the stimulable phosphor sheet 1 is switched back and conveyed in the reverse direction indicated by the arrow A11. Before the stimulable phosphor sheet 1 is thus switched back, the distribution means 54 is moved to the position indicated by the broken line. The stimulable phosphor sheet 1 is guided by the distribution means 54 and conveyed by the sheet conveyance means 50 into the cassette holding section 10 in the directions indicated by the arrows A12, A13 and A14. Before the stimulable phosphor sheet 1 is thus conveyed into the cassette holding section 10, the distribution means 51 is moved to the position indicated by the broken line. The stimulable phosphor sheet 1 is guided by the distribution means 51 and conveyed in the direction indicated by the arrow A15. In this manner, the stimulable phosphor sheet 1 is fed into the empty cassette 2 located in the cassette holding section 10. The erased reusable stimulable phosphor sheet 1 is housed in this manner in the cassette 2. The cassette 2, which now houses the erased reusable stimulable phosphor sheet 1, is taken out of the image read-out and reproducing apparatus, and fed into an external image recording apparatus. The erased reusable stimulable phosphor sheet 1 is again used to record a next radiation image.

On the other hand, when the stimulable phosphor sheet 1 taken out of the cassette 2 has been conveyed out of the light beam scanning section 20, a single recording sheet 4 is taken by a suction means 61 out of the magazine 5 in the recording sheet feeding section 60. The recording sheet 4 is fed into the sheet conveyance means 50, which is located in the vicinity of the magazine 5. The sheet conveyance means 50 receives the recording sheet 4 and conveys it into the light beam scanning section 20 in the directions indicated by the arrows B1, B2 and B3. In the light beam scanning section 20, the recording sheet 4 is conveyed in the direction indicated by the arrow B4. While the recording sheet 4 is being thus conveyed, the radiation image, which was read out from the stimulable phosphor sheet 1 in the manner described above, is reproduced on the recording sheet 4.

Specifically, when the recording sheet 4 is thus conveyed in the light beam scanning section 20, the light modulator 26 is operated in accordance with the image signal, which is fed out of the image processing unit 27. (The image signal corresponds to the read-out image signal, which was detected from the stimulable phosphor sheet 1 during the image readout.) At the same time, the operation of the long photomultiplier 22b is stopped. The recording sheet 4 is scanned with the laser beam 21, which now serves as the recording light modulated by the light modulator 26 and deflected by the rotating polygon mirror 24. In this manner, the radiation image, which was stored on the stimulable phosphor sheet 1, is reproduced as a photographic latent image on the recording sheet 4.

After the radiation image has been reproduced on the recording sheet 4 in the light beam scanning section 20, the recording sheet 4 is conveyed by the sheet conveyance means 50 into the automatic developing section 70 in the directions indicated by the arrows B5 and B6. At this time, the distribution means 52 is rotated to the position indicated by the broken line in FIG. 1 and guides the recording sheet 4 into the automatic developing section 70. In this image read-out and reproducing apparatus, the cassette holding section 10, the magazine holding section 40, the recording sheet feeding section 60, the light beam scanning section 20, the erasing section 30, and the sheet conveyance means 50 are accommodated in a single housing 7. Also, the automatic developing section 70 is integrally connected to the side of the housing 7. In the automatic developing section 70, the recording sheet 4 is subjected to a development process by being sent sequentially through a developing zone 71, a fixing zone 72, a washing zone 73 and a drying zone 74. The recording sheet 4 is then fed into a tray 75.

As described above, the image read-out and reproducing apparatus shown in FIG. 1 is provided with the magazine holding section 40 such that the image read-out can be carried out also for the stimulable phosphor sheets 1, 1, . . . , which are housed in the stimulable phosphor sheet magazine 3. Specifically, the magazine holding section 40 is provided with a sheet take-out means 41, which may be constituted of an air suction cup, or the like, and which takes the stimulable phosphor sheets 1, 1, . . . one by one from the stimulable phosphor sheet magazine 3. The stimulable phosphor sheet 1, which has been taken out of the stimulable phosphor sheet magazine 3, is fed into the sheet conveyance means 50, which is located in the vicinity of the magazine 3. The stimulable phosphor sheet 1 is then conveyed in the direction indicated by the arrow C1, and thereafter conveyed into the light beam scanning section 20 and the erasing section 30 in the directions indicated by the arrows C2 through C7. In the light beam scanning section 20 and the erasing section 30, the image readout and erasing are carried out on the stimulable phosphor sheet 1 in the same manner as that for the stimulable phosphor sheet 1, which is fed out of the cassette 2. The stimulable phosphor sheet 1 is then conveyed in the directions indicated by the arrows C8 and C9 and switched back in the direction indicated by the arrow C10. Thereafter, the stimulable phosphor sheet 1 is guided by the distribution means 53, which has moved to the position indicated by the broken line. The stimulable phosphor sheet 1 is thus conveyed into the tray 6 located in the tray holding section 80.

Figure 2:
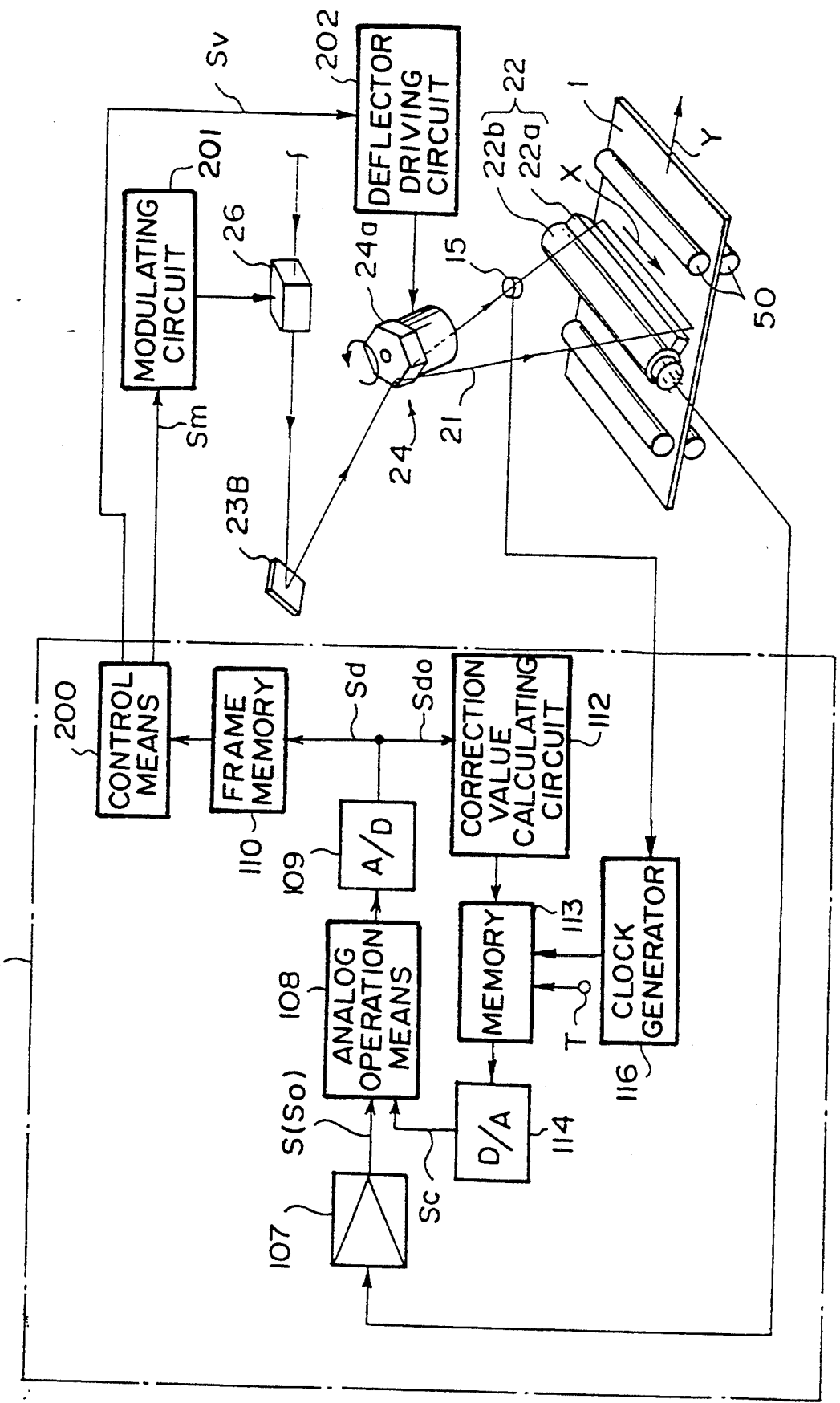
FIG. 2 is a schematic view showing the major part of the apparatus shown in FIG. 1.
Figure 3:
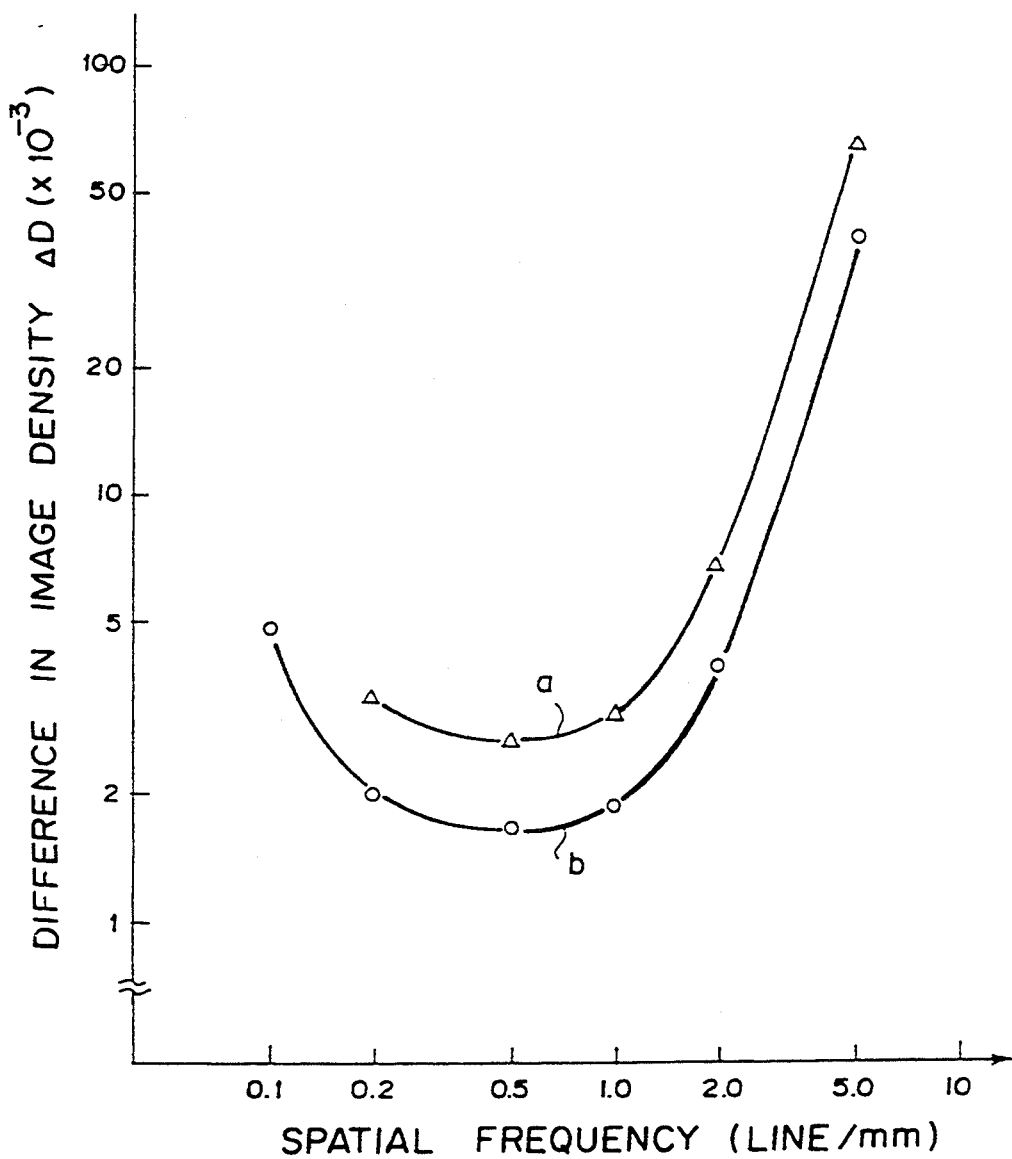
FIG. 3 is a graph showing perceptibility characteristics of a difference in image density.

How the scanning density is increased when a radiation image is to be reproduced will be described hereinbelow with reference to FIG. 2. During the reproduction of a radiation image, a control means 200 reads an image signal Sd, which has been stored in a frame memory 110. The control means 200 generates a modulation control signal Sm, which corresponds to the image signal Sd, and feeds it into a modulating circuit 201. The aforesaid light modulator 26 is operated by the modulating circuit 201 in accordance with the modulation control signal Sm (i.e., in accordance with the image signal Sd). Also, the control means 200 feeds a main scanning control signal Sv into a deflector driving circuit 202 in order to control the rotating polygon mirror 24. When a radiation image is to be reproduced, the speed, at which the rotating polygon mirror 24 rotates, is set at two times the speed, at which the rotating polygon mirror 24 rotates when a radiation image is read out. Also, during two adjacent main scanning periods, the control means 200 feeds out the same signal components of the modulation control signal Sm, which correspond to image signal components of the image signal Sd obtained from positions lying along a single main scanning line during the image readout. As a result, during the two adjacent main scanning periods, the laser beam 21, which is reflected and deflected by a single reflecting surface 24a of the rotating polygon mirror 24, and the laser beam 21, which is reflected and deflected by a next reflecting surface 24a of the rotating polygon mirror 24, are modulated in the same manner. Therefore, the same image information is reproduced along two adjacent main scanning lines on the recording sheet 4. Such reproduction of the same image information is effected for every set of two adjacent main scanning lines on the recording sheet 4.

FIG. 4 shows the relationship between the main scanning lines on the recording sheet 4, along which the image information is reproduced in the manner described above, and the main scanning lines on the stimulable phosphor sheet 1. As described above, the ratio of the speed, at which the rotating polygon mirror 24 rotates during the image readout, to the speed, at which the rotating polygon mirror 24 rotates during the image reproduction, is set at 1:2. Therefore, the pitch Pw of the main scanning lines on the recording sheet 4 is ½ of the pitch Pr of the main scanning lines on the stimulable phosphor sheet 1. Also, the image information, which was stored along a k'th main scanning line L(k) on the stimulable phosphor sheet 1, is reproduced both along a 2k'th main scanning line l(2k) and along a 2k−1'th main scanning line l(2k−1) on the recording sheet 4. For the reasons described above, when the scanning density with respect to the sub-scanning direction during the image reproduction, nonuniformity in the image density of an image reproduced on the recording sheet 4 can be rendered imperceptible. Therefore, even if the reflectivity fluctuates among the reflecting surfaces 24a, 24a, . . . of the rotating polygon mirror 24, deterioration in the image quality of the reproduced image can be kept small.

In the image reproducing method described above, the same image information is reproduced both along the 2k'th main scanning line l(2k) and along the 2k−1'th main scanning line l(2k−1) on the recording sheet 4. Alternatively, the reproduction of the image information along either one of the 2k'th main scanning line l(2k) and the 2k−1'th main scanning line l(2k−1) on the recording sheet 4 may be carried out in accordance with image signal components, which have been interpolated from the image signal components obtained from the corresponding main scanning line on the stimulable phosphor sheet 1. Specifically, in the example of FIG. 4, the reproduction of image information along the 2k−1'th main scanning line l(2k−1) on the recording sheet 4 may be carried out in accordance with the image signal components of the image signal Sd, which have been obtained from the k'th main scanning line L(k) on the stimulable phosphor sheet 1. Also, the image signal components of the image signal Sd obtained from the k'th main scanning line L(k) on the stimulable phosphor sheet 1 and the image signal components of the image signal Sd obtained from the adjacent main scanning line L(k+1), which represent picture elements located at corresponding positions with respect to the main scanning direction, may be averaged. The reproduction of image information along the 2k'th main scanning line l(2k) on the recording sheet 4 may then be carried out in accordance with the image signal components, which have thus been obtained from the averaging process. In such cases, the scanning along the main scanning line l(2k) during the image reproduction is carried out in half accordance with the image signal components of the image signal Sd, which have been obtained from the main scanning line L(k). Therefore, such cases are also embraced in the scope of the image reproducing method in accordance with the present invention.

Also, in the image reproducing method described above, the scanning density during the image reproduction is set at two times the scanning density during the image readout. Alternatively, the scanning density during the image reproduction may be set at, for example, three, four, or six times the scanning density during the image readout. Also, in the image reproducing method described above, when a radiation image is to be reproduced, the speed, at which the rotating polygon mirror 24 rotates, is set at two times the speed, at which the rotating polygon mirror 24 rotates when a radiation image is read out. Alternatively, the speed, at which the rotating polygon mirror 24 rotates, may be kept the same when a radiation image is read out and when it is reproduced, and the speed, at which the recording sheet 4 is scanned in the sub-scanning direction (i.e., at which the recording sheet 4 is conveyed) during the image reproduction, may be set at ½ of the speed, at which the stimulable phosphor sheet 1 is scanned in the subscanning direction (i.e., at which the stimulable phosphor sheet 1 is conveyed) during the image readout. In such cases, the same effects can be obtained as when the speed, at which the rotating polygon mirror 24 rotates during the image reproduction, is set at two times the speed, at which the rotating polygon mirror 24 rotates during the image readout. However, from the point of view of the speed, with which a radiation image can be reproduced, it is advantageous that the speed, at which the rotating polygon mirror 24 rotates during the image reproduction, be increased.

Additionally, in the described above, when a radiation image is reproduced, the laser beam 21 is scanned with the light modulator 26. Alternatively, in cases where a semiconductor laser, or the like, is employed as the source of the laser beam 21, the semiconductor laser, or the like, may be directly modulated.

Further, in the image reproducing method described above, the long photomultiplier 22b is used as the photoelectric read-out means. Alternatively, a combination of a known light guide member and a small photomultiplier (which is described in U.S. Pat. No. 4,346,295), a line sensor, or the like, may be employed as the photoelectric read-out means.

The aforesaid image reproducing method is applicable when the light emitted by the stimulable phosphor sheet 1 is detected, and when other recording medium, such as photographic film, is scanned with a light beam, and light, which has been reflected by the scanned portion of the recording medium or has passed through the scanned portion of the recording medium and which carries image information, is detected.

As described above in detail, in the aforesaid image reproducing method, the apparent scanning density is increased during the image reproduction such that nonuniformity in the image density of a reproduced image may become imperceptible. Therefore, a visible image having good image quality can be reproduced. Also, with the aforesaid image reproducing method, because nonuniformity in the image density of a reproduced image can be rendered imperceptible, the tolerance with respect to fluctuations in the reflectivity among the reflecting surfaces 24a, 24a, ... of the rotating polygon mirror 24, surface inclination of each reflecting surface 24a, or the like, can be kept gentle. Therefore, a comparatively cheap rotating polygon mirror can be utilized, and the cost of the image read-out and reproducing apparatus can be kept low.

In the aforesaid image reproducing method, the light beam modulated in accordance with image signal components of the image signal, which correspond to positions lying along each scanning line on the recording medium, is utilized to scan along a plurality of scanning lines on the recording material such that parts of adjacent scanning lines on the recording material may overlap one upon the other. Therefore, each scanning line composed of the plurality of the scanning lines on the recording material tends to not to have a sharp appearance. The image reproducing method in accordance with the present invention prevents each scanning line composed of the plurality of the scanning lines on the recording material from having an appearance which is not sharp. Specifically, with the image reproducing method in accordance with the present invention, when the light beam modulated in accordance with the image signal components of the image signal, which correspond to positions lying along each scanning line on the recording medium, is utilized to scan along a plurality of scanning lines on the recording material such that parts of adjacent scanning lines on the recording material may overlap one upon the other, the intensity of the light beam is changed each time the light beam scans along one of the plurality of the scanning lines on the recording material.

Embodiments of the image reproducing method in accordance with the present invention will be described hereinbelow with reference to FIGS. 5A and 5B, FIGS. 6A and 6B, and FIG. 7.

FIG. 5A is a graph showing an example of how the intensity of a light beam is distributed when the light beam modulated in accordance with image signal components of an image signal, which have been obtained from each scanning line during the operation for reading out an image recorded on a recording medium, is utilized to scan along a plurality of scanning lines on a recording material in the aforesaid image reproducing method. As clear from FIG. 5A, the intensity of the light beam is kept the same during the scanning along the plurality of the scanning lines on the recording material. As a result, the scanning intensity in the area composed of the plurality of the scanning lines on the recording material becomes approximately uniform as a whole. Therefore, each scanning line composed of the plurality of the scanning lines on the recording material appears unsharply. For example, as illustrated in FIG. 6A, the light beam modulated in accordance with the image signal components of the image signal, which have been obtained from each scanning line during the operation for reading out the image recorded on the recording medium, is utilized to scan along three scanning lines on the recording material such that parts of adjacent scanning lines on the recording material may overlap one upon the other (i.e., three scanning steps are carried out for the area inside of a single picture element on the recording material). In such cases, as indicated by hatching in FIG. 6A, the first scanning line and the third scanning line enter the areas inside of the adjacent picture elements. Therefore, each scanning line, which is composed of the three scanning lines on the recording material, appears unsharply. Accordingly, the sharpness of the reproduced image becomes bad.

The image reproducing method in accordance with the present invention is characterized by changing the intensity of the light beam each time the light beam scans along one of the plurality of the scanning lines on the recording material. For example, as illustrated in FIG. 5B, when scanning is carried out along a plurality of scanning lines on the recording material, which constitute a single scanning line as a whole, the intensity of the light beam is set at a higher level during the scanning along middle scanning lines among the plurality of the scanning lines, and is set at a lower level during the scanning along outer scanning lines among the plurality of the scanning lines. For example, as illustrated in FIG. 6B, the light beam modulated in accordance with the image signal components of the image signal, which have been obtained from each scanning line during the operation for reading out the image recorded on the recording medium, is utilized to scan along three scanning lines on the recording material such that parts of adjacent scanning lines on the recording material may overlap one upon the other (i.e., three scanning steps are carried out for the area inside of a single picture element on the recording material). In such cases, the intensity of the light beam is set at a lower level during the scanning along the first and third scanning lines, and is set at a higher level during the scanning along the second scanning line. Therefore, no problem occurs in that, as indicated by hatching in FIG. 6A, the first scanning line and the third scanning line enter the areas inside of the adjacent picture elements. Accordingly, each scanning line, which is composed of the three scanning lines on the recording material, can be prevented from having an appearance which is not sharp, and the sharpness of the reproduced image can be kept good.

Figure 7:
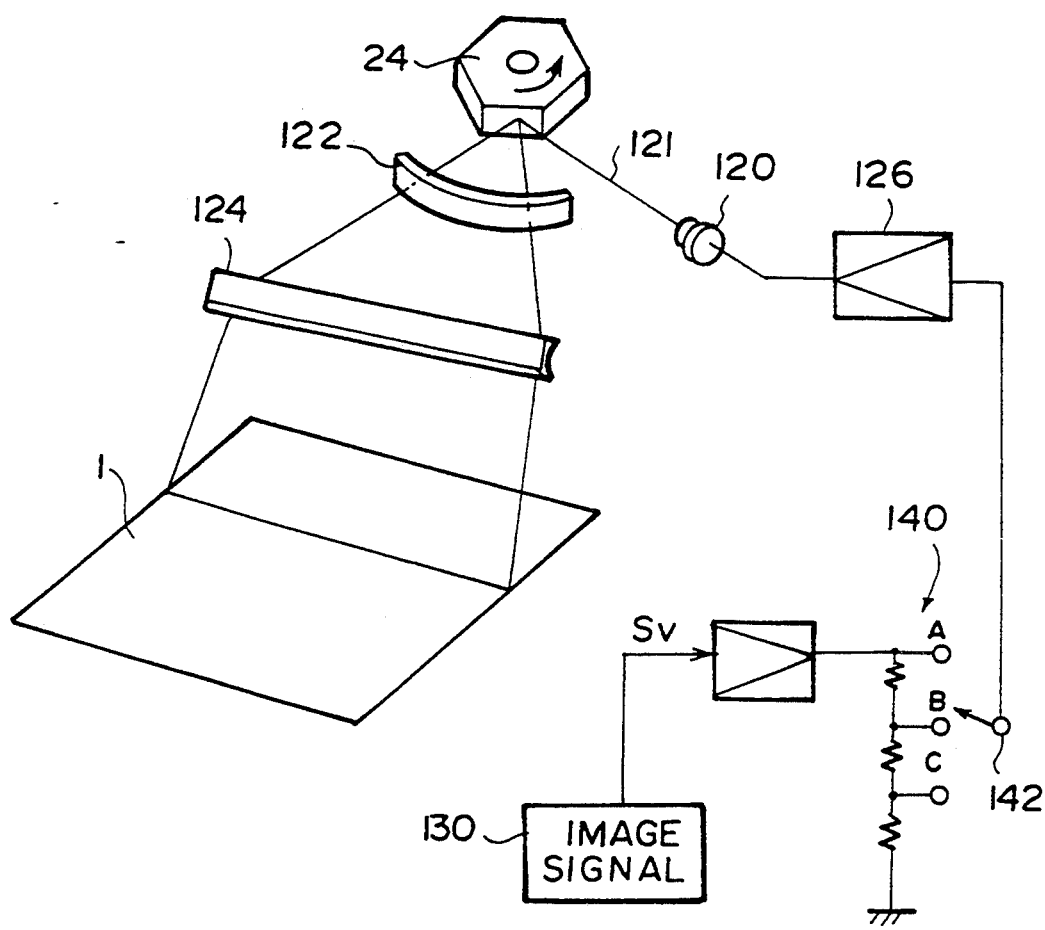
FIG. 7 is a schematic view showing an example of an apparatus for carrying an embodiment of the image reproducing method in accordance with the present invention.

How the intensity of the light beam is changed while the light beam is scanning along the plurality of the scanning lines, which constitutes a single scanning line as a whole, on the recording material will be described hereinbelow with reference to FIG. 7.

Figure 8:
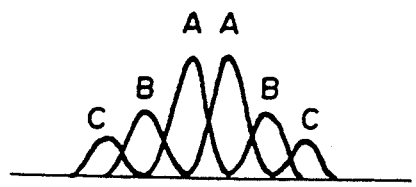
FIG. 8 is a graph showing an example of how the intensity of a light beam is distributed in the embodiment of FIG. 7 when the light beam modulated in accordance with image signal components of an image signal, which have been obtained from each scanning line during the operation for reading out an image recorded on a recording medium, is utilized to scan along a plurality of scanning lines on a recording material.

A laser beam 121 is produced by a semiconductor laser 120. The laser beam 121 is deflected by the rotating polygon mirror 24 and passes through an f$\theta$ lens 122. The laser beam 121 is then reflected by a bent mirror 124 and is caused to scan the photosensitive recording sheet 4. A driver 126 operates the semiconductor laser 120. An image signal Sv is fed out of an image signal feeding source 130. The image signal Sv passes through a change-over switch 140 and is fed into the driver 126. In cases where the rotating polygon mirror 24 has six reflecting surfaces, the image signal feeding source 130 feeds out image signal components of the image signal Sv six times, which image signal components have been obtained from each scanning line on a stimulable phosphor sheet serving as a recording medium. Specifically, the same image signal components of the image signal Sv, which image signal components have been obtained from a single scanning line on the stimulable phosphor sheet, are fed out six times with respect to the six reflecting surfaces of the rotating polygon mirror 24. The change-over switch 140 has three terminals A, B, and C, which divide a drive voltage fed to control a drive current for the driver 120. A change-over switch terminal 142 is selectively connected to one of the three terminals A, B, and C. In this manner, the level of the voltage representing the image signal components of the image signal Sv, which have been obtained from each scanning line on the stimulable phosphor sheet and which are fed from the image signal feeding source 130 into the driver 126, is set at a high level (A), a middle level (B), or a low level (C). For example, the level of the voltage is changed in the pattern of C, B, A, A, B, and then C. In such cases, as illustrated in FIG. 8, the intensity of the laser beam 121 can be changed for each of the six scanning lines on the recording sheet 4 such that the intensity of the laser beam 121 may be higher for the two middle scanning lines than the outer scanning lines.

In the aforesaid embodiment of the image reproducing method in accordance with the present invention, the drive current is changed by the change-over switch 140. Alternatively, any of other known techniques for changing the output of the semiconductor laser may be employed.

For example, when a digital image signal is converted by a D/A converter into an analog image signal, a reference voltage (Vref) in the D/A converter may be changed. Alternatively, a multiplication type of D/A converter may be employed, and its setting value may be changed. As another alternative, a calculation may be made from the image signal, and the level of the image signal may be changed. As a further alternative, a plurality of gradation tables may be utilized at the stage prior to a D/A converter, and one of the gradation tables may be employed selectively.

What is claimed is:

1. An image reproducing method, wherein a light beam is modulated in accordance with an image signal, which is made up of a series of image signal components representing an image recorded on a recording medium, and the modulated light beam is caused by a light beam scanning system, which includes a rotating polygon mirror, to two-dimensionally scan a recording material, whereby the image is reproduced on the recording material, the image reproducing method comprising the steps of:

i) utilizing the light beam modulated in accordance with image signal components of said image signal, which correspond to positions lying along each scanning line on said recording medium, to scan along a plurality of scanning lines on said recording material such that parts of adjacent scanning lines on said recording material overlap one upon the other, and ii) changing the intensity of said light beam each time said light beam scans along one of the plurality of said scanning lines on said recording material.

2. A method as defined in claim 1 wherein the intensity of said light beam is set at a higher level during the scanning along a middle scanning line among the plurality of said scanning lines on said recording material, and is set at a lower level during the scanning along an outer scanning line among the plurality of said scanning lines on said recording material.

3. A method as defined in claim 1 wherein said recording material is a photosensitive material.

4. A method as defined in claim 1 wherein said image recorded on said recording medium is a radiation image, which has been stored on a stimulable phosphor sheet serving as said recording medium.

5. A method as defined in claim 4 wherein said image signal is obtained by exposing said stimulable phosphor sheet, on which said radiation image has been stored, to stimulating rays, which cause said stimulable phosphor sheet to emit light in proportion to the amount of energy stored thereon during its exposure to radiation, and photoelectrically detecting the emitted light.

6. A method as defined in claim 5 wherein said stimulating rays are a laser beam.

7. A method as defined in claim 1 wherein said recording medium is photographic film.

8. A method as defined in claim 1 wherein said light beam is a laser beam.

9. An image reproducing apparatus, wherein a light beam is modulated in accordance with an image signal, which is made up of a series of image signal components representing an image recorded on a recording medium, and the modulated light beam is caused by a light beam scanning system, which includes a rotating polygon mirror, to two-dimensionally scan a recording material, whereby the image is reproduced on the recording material, the image reproducing apparatus comprising:

i) a scanning means for carrying out the scanning such that the light beam modulated in accordance with image signal components of said image signal, which correspond to positions lying along each scanning line on said recording medium, is utilized to scan along a plurality of scanning lines on said recording material, and parts of adjacent scanning lines on said recording material overlap one upon the other, and ii) a light beam intensity control means for changing the intensity of said light beam each time said light beam scans along one of the plurality of said scanning lines on said recording material.

10. An apparatus as defined in claim 9 wherein said light beam intensity control means changes the intensity of said light beam such that it is set at a higher level during the scanning along a middle scanning line among the plurality of said scanning lines on said recording material, and is set at a lower level during the scanning along an outer scanning line among the plurality of said scanning lines on said recording material.

11. An apparatus as defined in claim 9 wherein said recording material is a photosensitive material.

12. An apparatus as defined in claim 9 wherein said image recorded on said recording medium is a radiation image, which has been stored on a stimulable phosphor sheet serving as said recording medium.

13. An apparatus as defined in claim 12 wherein said image signal is obtained by exposing said stimulable phosphor sheet, on which said radiation image has been stored, to stimulating rays, which cause said stimulable phosphor sheet to emit light in proportion to the amount of energy stored thereon during its exposure to radiation, and photoelectrically detecting the emitted light.

14. An apparatus as defined in claim 13 wherein said stimulating rays are a laser beam.

15. An apparatus as defined in claim 9 wherein said recording medium is photographic film.

16. An apparatus as defined in claim 9 wherein said light beam is a laser beam.

* * * * *